United States Patent [19]

McEntire et al.

[11] Patent Number: 5,693,739
[45] Date of Patent: Dec. 2, 1997

[54] PHENOLIC POLYMERS FROM AMINO PHENOLS AND ANHYDRIDE OR EPOXY POLYMERS

[75] Inventors: Edward E. McEntire; Richard M. Nugent, Jr., both of Allison Park; Ralph C. Gray, Butler, all of Pa.

[73] Assignee: PPG Industries, Inc., Pittsburgh, Pa.

[21] Appl. No.: 576,717

[22] Filed: Dec. 21, 1995

[51] Int. Cl.[6] ................................................ C08G 59/42
[52] U.S. Cl. .................... 128/112; 528/86; 528/106; 525/7; 525/327.6; 525/380; 524/508; 524/539; 524/540
[58] Field of Search ........................... 528/56, 112, 106, 528/86; 525/7, 327.6, 380; 524/508, 539, 540

[56] References Cited

U.S. PATENT DOCUMENTS

| | | | |
|---|---|---|---|
| 3,695,942 | 10/1972 | Binns | 148/6.15 |
| 3,895,970 | 7/1975 | Blum et al. | 148/6.15 |
| 4,433,015 | 2/1984 | Lindert | 427/388 |
| 4,457,790 | 7/1984 | Lindert et al. | 148/6.15 |
| 4,517,028 | 5/1985 | Lindert | 148/6.14 |
| 4,740,561 | 4/1988 | Tsujimoto et al. | 525/327.6 |
| 4,780,546 | 10/1988 | Kita et al. | 548/548 |
| 4,816,523 | 3/1989 | Tsujimoto et al. | 525/380 |
| 4,840,667 | 6/1989 | Siegl et al. | 106/14.15 |
| 5,159,030 | 10/1992 | Hefner, Jr. | 525/502 |
| 5,209,788 | 5/1993 | McMillen et al. | 148/247 |

*Primary Examiner*—James J. Seidleck
*Assistant Examiner*—Duc Truong
*Attorney, Agent, or Firm*—Dennis G. Millman

[57] ABSTRACT

A cationic final rinse metal treatment composition comprises a water soluble or water dispersible phenolic polymer which is the reaction product of: an amino phenol and either an anhydride-containing polymer or a di-epoxide, said polymer including a group imparting cationic functionality to the polymer.

14 Claims, No Drawings

PHENOLIC POLYMERS FROM AMINO PHENOLS AND ANHYDRIDE OR EPOXY POLYMERS

BACKGROUND OF THE INVENTION

This invention relates to improvements in chemical surface pretreatment of metal, particularly to improved non-chrome final rinse compositions.

It is well known that to improve paint adhesion to metal surfaces and the corrosion resistance of metal, a chemical surface pretreatment can be employed prior to painting. Normally the metal is pretreated with chemicals that promote the formation of a metal phosphate, usually zinc or iron phosphate, on the surface. Additionally the pretreated surface of the metal is usually rinsed with a solution of chromic acid which contains hexavalent chromium compounds. Chromic acid rinses enhance corrosion resistance and paint adhesion. However, because of the toxic nature of hexavalent chromium compounds, expensive water treatment methods are usually used to prevent discharges of chromium containing water to the environment. Therefore, it is now deemed desirable to replace chromic acid rinses in metal chemical surface pretreatment systems.

Non-chrome final rinses have been developed, and usually contain at least one metal ion. Some examples are disclosed in U.S. Pat. Nos. 3,695,942, 3,895,970, 4,457,790, and 5,209,788. However, most non-chrome rinses have not risen to the level of commercially useful final rinses. Even though useful, the prior art non-chrome rinses tend not to consistently match performance of chrome rinses. Accordingly, non-chrome rinses having improved effectiveness are desirable.

SUMMARY OF THE INVENTION

In accordance with the present invention, there is provided an improved non-chrome final rinse composition for surface treatment of metal that comprises an aqueous solution of phenolic polymers that have been prepared from amino phenols and either polymers containing anhydride groups or di-epoxide polymers. More specifically, the non-chrome final rinse composition of the present invention comprises a water soluble or water dispersible phenolic polymer which is the reaction product of:

(a) an amino phenol having the following general formula:

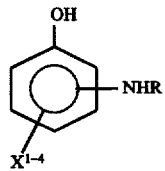
(1)

where:

$X^1$ through $X^4$=H, OH, halogen, or an alkyl, aryl, or ether group, or group that is not reactive with anhydrides or epoxides;

R=H or a lower alkyl group having between 1 and 6 carbon atoms;

and, (b) an anhydride-containing polymer having one of the following general formulas:

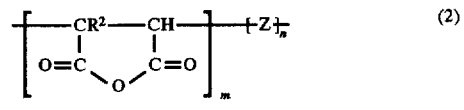

or

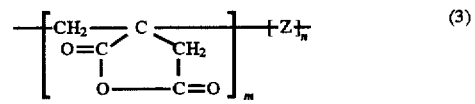

where:

$R^2$=H or $CH_3$

Z=a group derived from an ethylenically unsaturated monomer or monomers capable of polymerizing with an unsaturated anhydride m and n are integers equal to or greater than 1, the sum of which is sufficient to provide a molecular weight of 600 to 100,000 to the polymer;

or, (c) a di-epoxide having the following general formula:

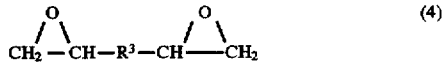
(4)

where:

$R^3$=an alkyl, aryl, or cycloalkyl group, optionally containing functional groups such as ether, hydroxyl groups, or other groups that do not interfere with the reaction.

The phenolic polymer described above is rendered water soluble or water dispersible by copolymerizing a monomer containing a group capable of being rendered cationic by neutralization with an acid, or by attaching such a group onto the polymer, for example by the Mannich reaction with subsequent neutralization with an acid.

DETAILED DESCRIPTION OF THE INVENTION

The water soluble or water dispersible phenolic polymer of the present invention is made by reacting a suitable amino phenol having the structure (1) set forth above with an anhydride-containing polymer having one of the structures (2) or (3) above Alternately, the aforementioned aminophenol (1) can be reacted with a di-epoxide having the structure (4) set forth above.

Some examples of suitable amino phenols include p-aminophenol, o-aminophenol, m-aminophenol, 4-amino-2-chlorophenol, 4-amino-2-fluorophenol, 5-aminoresorcinol, 4-aminoresorcinol, 4-aminocatechol, 2-aminoresorcinol, 3-amino-2-chlorophenol, 2-amino-6-chlorophenol, 4-amino-2-chlorophenol, 2-amino-4-chlorophenol, 3-amino-5-methoxyphenol, 4-amino-3-methoxyphenol, 4-amino-2-methoxyphenol, 3-amino-5-methylphenol, 3-amino-5-methylphenol, 5-amino-2-methylphenol, 3-N-methylaminophenol, and 4-(methylamino)phenol.

The anhydride-containing polymers are copolymers of an unsaturated anhydride (e.g., maleic anhydride, itaconic anhydride, and methylmaleic anhydride) with other ethylenically unsaturated monomers which may be selected from olefins (e.g., ethylene, propylene, isobutylene, isobutylene, 1-hexene), ethylenically unsaturated aromatic compounds (e.g., styrene, alpha-methyl styrene, para-methyl styrene and vinyl toluene), and/or one or more alkyl esters of acrylic acid or methacrylic acid (e.g., methyl methacrylate, isobutyl methacrylate, ethyl methacrylate, butyl methacrylate, ethyl acrylate, butyl acrylate, and 2-ethylhexyl acrylate). Other suitable copolymerizable ethylenically unsaturated monomers that may be copolymerized with the unsaturated anhydride include nitriles such as acrylonitrile and methacrylonitrile; vinyl and vinylidine halides such as vinyl chloride and vinylidine fluoride and vinyl esters such as vinyl acetate. It should be noted that the monomer units of the anhydride containing polymer may repeat in alternating or random sequences.

Suitable di-epoxides include polyglycidyl ethers of polyphenols, such as bisphenol A. These are produced by etherification of a polyphenol with epichlorohydrin in the presence of an alkali. The phenolic compound can be 2,2-bis(4-hydroxyphenyl)propane; 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycylohexyl) propane.

The water soluble or water dispersible phenolic polymer of the present invention typically have a weight average molecular weight ranging from about 600 to about 100,000, preferably from about 1000 to about 50,000, more preferably from about 2000 to about 10,000, as determined by gel permeation chromatography (GPC) using polystyrene standards. When the water soluble or water dispersible phenolic polymer is made by the reaction of an amino phenol and an anhydride containing polymer, the ratio of anhydride group to amine group is preferably about 1:1 to about 2:1. Any excess anhydride groups may be reacted with other amines or alcohols. The final acid value of the polymer should range from about 0 to about 50, preferably from about 0 to about 20, more preferably from about 0 to about 10.

When the water soluble or water dispersible phenolic polymer is made by the reaction of an amino phenol and a di-epoxide, the ratio of epoxy group to amine hydrogen is preferably about 2:1 to about 1:2. Any remaining epoxy functionality may be reacted with primary or secondary amines, or other species to render the polymer cationic.

Cationic functionality can be imparted to the resultant phenolic polymer by the Mannich reaction, where the phenolic polymer is reacted with a secondary amine and an aldehyde, preferably formaldehyde, to yield a product which can be neutralized with an acid to make the polymer water soluble or water dispersible. Alternately, cationic functionality can be accomplished for the polymer based on anhydride by the use of a co-monomer having cationic functionality such as 4-vinyl pyridine (an amine), or methacrylamidopropyl trimethyl ammonium chloride (a quaternary ammonium salt). Additionally, cationic polymers can be formed by reacting aziridine with acid functional acrylic polymers, or by reacting amines with chlorofunctional monomers. Alternate methods for imparting cationic functionality to phenolic polymers prepared from di-epoxides can include reacting some of the epoxy groups with sulfides such as bis-hydroxyethyl sulfide to form ternary sulfonium salts, or by reacting the epoxy groups with amines or hydroxy containing amines to form polymers with amine residues which can be made water dispersible or water soluble by neutralization with acid. Suitable acids include hydrochloric acid, acetic acid, nitric acid, sulfamic acid and methane sulfonic acid.

Cosolvents to aid in solubility or dispersibility of the phenolic polymer in water may be present. These solvents usually are compounds which contain both polar and non-polar character. Examples of suitable cosolvents include n-methyl pyrolidinone, dimethyl formamide, dimethylether of diethylene glycol, 1-methoxy-2-propanol, and n-butanol.

The concentration of the water soluble or water dispersible phenolic polymer in the aqueous composition of the present invention could range from about 0.01 to about 10 percent by weight, preferably from about 0.05 to about 1 percent by weight. The pH of the aqueous composition can vary from about 1 to about 8, preferably from about 2 to about 6.

In the practice of the invention, the aqueous non-chrome final rinse composition is applied to a substrate that has been pretreated by conversion coating with, for example, a phosphate conversion coating. The aqueous rinse composition can be applied by spray or immersion techniques. The rinse time should be as long as would ensure sufficient wetting of the surface with the aqueous rinse composition. Typically the rinse time is about 5 seconds to about 10 minutes, and preferably from about 15 seconds to about 1 minute over a temperature range of about 15° C. to about 100° C. and preferably 20° C. to about 60° C. After the final rinse, the metal is usually dried either by air drying at ambient conditions or forced drying. In some instances, a water rinse is employed after the final rinse. A protective or decorative coating is usually applied to the substrate after it has been pretreated as set forth above.

It has been found that the metal substrates that have been pretreated by phosphate conversion coating followed by a final rinse with the preferred non-chrome rinse compositions of the present invention exhibit corrosion resistance and adhesion which is at least equivalent to the results obtained by using chrome-containing final rinses. This and other aspects of the invention are further illustrated by the following non-limiting examples.

EXAMPLES

The following examples show the non-chrome rinse of this invention, the methods of preparing and using the same, and the comparison of the claimed rinses with prior art compositions.

The panels treated in the examples that follow have all been pretreated in the following process sequence unless otherwise noted in the example:

1. Cleaned with solution of CHEMKLEEN 166 and CHEMKLEEN 171A which are alkaline cleaners available from PPG Chemfil, Troy, Mich., by spraying for 2 minutes at 120° to 125° F. The cleaning solution was a mixture of 15 parts by weight of CHEMKLEEN 166 with 1 part by weight of CHEMKLEEN 171A, with 2 ounces of the resultant mixture added to one gallon of water.

2. Hot water rinse the panels by immersion in water for 15 seconds at 115° to 120° F.

3. Apply "Rinse Conditioner" nucleating agent available from PPG Chemfil by spraying for 60 seconds at 100° to 105° F.

4. Apply CHEMFOS 710, zinc phosphate conversion coating available from PPG Chemfil, by spraying for 2 minutes at 125° to 130° F.

5. Rinse by immersion in deionized water for 15 seconds at ambient temperature.

6. Final rinse treatment by immersion for 60 seconds at ambient temperature. Concentration of the aqueous rinse compositions was adjusted to 1000 ppm based on solids of the final rinse composition.

7. Rinse with deionized water by spraying for 60 seconds at ambient temperature.

All panels were then coated with ENVIROPRIME™ III electrocoat primer, commercially available from PPG Industries, Inc., Cleveland, Ohio, and cured for 30 minutes at 171° C. (340° F.), with a resultant dry film thickness of 0.9–1.0 mils. The test panels were then topcoated with "DHT-5920" white acrylic enamel commercially available from PPG Industries, Inc., and cured for 30 minutes at 250° F. (121° C.), with a resultant dry film thickness if 1.8–2.0 mils. The test panels were then subjected to 50 cycles of a Chipping scab cycle test described below.

CHIPPING SCAB CYCLE TEST

The test panels were first chipped by clamping a test panel in an Erichsen 508 Gravelometer and subjecting the test panel to 415 grams of S-780 1/16 steel shot propelled at the panel at 26 psi (1.8 bar) nozzle pressure.

The test panels were then subjected to the following cycle:

First, panels were hang vertically and dipped in a 5% salt solution (sodium chloride) at ambient temperature for 15 minutes. Second, the panels were removed from the salt solution and allowed to recover for 75 minutes.

Third, The test panels ere placed in a humidity cabinet maintained at 85% relative humidity and 140° F. (60° C.) for 22.5 hours. The total time for one cycle was 24 hours and was repeated 50 times (50 cycles).

Each panel was then placed in water, removed from the water, wiped dry and immediately tape tested by covering the target area with 3M Scotch Brand 898 tape and then rapidly removing the tape from the test panel in one rapid pull. The percent paint loss was then calculated by comparing the area of paint removed from a 4 inch square target area with the total target area.

EXAMPLE A

The preparation of an anhydride containing polymer was prepared from the following mixture of ingredients.

| Ingredients | Weight in Grams |
|---|---|
| Charge 1 | |
| Methyl isobutyl ketone | 450 |
| Charge 2 | |
| Methyl isobutyl ketone | 475 |
| Styrene | 550 |
| Maleic Anhydride | 450 |
| Charge 3 | |
| Methyl isobutyl ketone | 120 |
| Tertiary Dodecyl Mercaptan | 20 |
| LUPERSOL ®575[1] | 50 |
| Charge 4 | |
| Methyl isobutyl ketone | 30 |
| LUPERSOL 575 | 5 |
| Charge 5 | |
| methyl-pyrolidinone | 1075 |

[1]t-amyl peroctoate available from Elf Atochem.

Charge 1 was heated under nitrogen in a reaction vessel with agitation to 100° C. Charge 2 and Charge 3 were added in separate streams to the reaction vessel simultaneously and continued in a substantially continuous manner over a period of 3 hours while maintaining the reaction mixture at 100° C. Charge 4 was then added to the reaction mixture over a period of 1 hour and then the reaction mixture was held at 100° C. for 1 hour. The reaction mixture was then cooled to 70° C. and then Charge 5 was added. The resultant mixture was reheated to 100° C. and distillate was removed under vacuum. The resultant anhydride containing polymer had a total solids content of 61.4 percent determined at 110° C. for one hour, and a weight average molecular weight of 6045 as determined by gel permeation chromatography (GPC) using polystyrene standards.

EXAMPLE B

The anhydride containing polymer of Example A was reacted with 4-amino phenol to form the phenolic polymer as follows.

| Ingredients | Weight in Grams |
|---|---|
| Charge 1 | |
| Copolymer from Example A | 944.6 |
| m-Pyrolidinone | 572.9 |
| Charge 2 | |
| 4-aminophenol | 224.5 |

Charge 1 was heated under nitrogen in a reaction vessel with agitation to 70° C. Charge 2 was then added and the reaction mixture was heated to 150° C. and held for sufficient time for the reaction to complete while continuously removing distillate. The reaction was considered complete when the acid MEQ equaled 0.125. The resultant polymer had a total weight solids content of 47.6 percent determined at 110° C. for 2 hours.

EXAMPLE C

Cationic functionality was imparted on the phenolic polymer of Example B by the use of the Mannich Reaction and resultant product was made water soluble by neutralization with an acid as follows.

| Ingredients | Weight in Grams |
|---|---|
| Charge 1 | |
| Phenolic polymer from Example B | 422.8 |
| Charge 2 | |
| Deionized Water | 9.0 |
| Methyl Ethanol Amine | 43.5 |
| Charge 3 | |
| 37% Formaldehyde | 40.5 |
| Charge 4 | |
| 37% Hydrochloric Acid | 49.3 |
| Deionized Water | 100.0 |
| Charge 5 | |
| Deionized Water | 154.6 |

Charge 1 was heated under nitrogen in a suitable reaction vessel with agitation to 30° C. Charge 2 was then added and the reaction mixture was heated to 50° C. Charge 3 was then continuously added over a period of 1 hour. The resultant reaction mixture was held for 3 hours at 50° C., then heated to 80° C. and held at that temperature for 3 hours. The reaction mixture was then cooled to 50° C. and then Charge 4 was added and mixed well before Charge 5 was added. The reaction mixture was cooled to ambient temperature, and the resultant polymer had a total weight solids content of 40.6 percent determined at 110° C. for 2 hours, and an acid value of 39.25.

EXAMPLE D

Example D shows the preparation of a phenolic polymer by the reaction of "SMA-1000A," a styrene maleic anhydride copolymer manufactured by Elf Atochem, with 4-amino phenol, onto which cationic functionality was imparted by the use of the Mannich reaction, and thereafter made water soluble by neutralization with hydrochloric acid.

| Ingredients | Weight in Grams |
|---|---|
| Charge 1 | |
| SMA-1000A | 233.8 |
| m-Pyrolidinone | 545.5 |
| Charge 2 | |
| 4-aminophenol | 112.3 |
| Charge 3 | |
| Deionized water | 36.0 |
| Methyl Ethanol Amine | 75.0 |
| Charge 4 | |
| 37% Formaldehyde | 81.1 |
| Charge 5 | |
| 37% Hydrochloric Acid | 98.6 |
| Deionized Water | 200.0 |
| Charge 6 | |
| Deionized Water | 243.0 |

Charge 1 was heated under nitrogen in a suitable reaction vessel with agitation to 70° C. Charge 2 was then added and the reaction mixture was heated to 150° C. and held for sufficient time for the reaction to complete while continuously removing the distillate. The reaction was considered complete when the acid value equaled 19.4. The reaction mixture was then cooled to 50° C. and then Charge 3 was added. Charge 4 was then continuously added over a period of 1 hour. The resultant mixture was held for 3 hours at 50° C., then heated to 80° C. and held at that temperature for 3 hours. The reaction mixture was then cooled to 50° C. and then Charge 5 was added and mixed well before Charge 6 was added. The reaction mixture was cooled to ambient temperature, and the resultant polymer had a total weight solids content of 36.3 percent determined at 110° C. for 2 hours, and an acid value of 34.

EXAMPLE E

A phenolic polymer was prepared from the reaction of SMA 1000A styrene maleic anhydride copolymer with 4-aminophenol as follows.

| Ingredients | Weight in Grams |
|---|---|
| Charge 1 | |
| m-Pyrolidinone | 1038.0 |
| Charge 2 | |
| SMA-1000A | 467.5 |
| Charge 3 | |
| 4-aminophenol | 224.5 |

Charge 1 was heated under nitrogen in a reaction vessel with agitation to 100° C. Charge 2 was then added and then the reaction mixture was cooled to 70° C. Charge 3 was then added and the reaction mixture was heated to 150° C. and held for sufficient time for the reaction to complete while continuously removing distillate. The reaction was considered complete when the acid MEQ equaled 0.197. The resultant polymer had a total weight solids content of 47.5 percent determined at 110° C. for 2 hours.

EXAMPLE F

Cationic functionality was imparted on the phenolic polymer of Example E by the use of the Mannich Reaction and the resultant product was made water soluble by neutralization with hydrofluoric acid as follows.

| Ingredients | Weight in Grams |
|---|---|
| Charge 1 | |
| Phenolic polymer from Example E | 839.8 |
| Charge 2 | |
| Deionized Water | 36.0 |
| Methyl Ethanol Amine | 86.3 |
| Charge 3 | |
| 37% Formaldehyde | 81.1 |

Charge 1 was heated under nitrogen in a suitable reaction vessel with agitation to 50° C., then Charge 2 was added. Charge 3 was then continuously added over a period of 1 hour. The resultant reaction mixture was held for 3 hours at 50° C., then heated to 80° C. and held at that temperature for 3 hours. The reaction mixture was then cooled to ambient temperature. To neutralize the resultant phenolic polymer, 146 grams of 10% hydrofluoric acid was added to 759.2 grams of the phenolic polymer, mixed well and then 239.5 grams of deionized water was added to the mixture. The resultant polymer had a total weight solids content of 31.2 percent determined at 110° C. for 2 hours.

EXAMPLE 1

Cold rolled steel and electrogalvanized test panels were pretreated and coated as detailed above using final rinses prepared from Examples C, D, and F, then subjected to 50 cycles of the Chipping Scab Cycle Test detailed above. These panels were compared to panels similarly prepared and tested, but using as the final rinse either deionized water or CHEMFOS 20, a chrome-containing final rinse composition commercially available from PPG Chemfil, Troy, Mich. The results were as follows.

| Final Rinse | Percent Paint Loss | |
|---|---|---|
| | Cold Rolled Steel | Electrogalvanized |
| Example C | 1.0 | 0.6 |
| Example D | 2.1 | 1.2 |
| Example F | 3.9 | 0.9 |
| CHEMFOS 20 | 3.6 | 1.3 |
| Deionized water | 7.6 | 1.8 |

EXAMPLE G

An anhydride containing polymer was prepared from the following mixture.

| Ingredients | Weight in Grams |
|---|---|
| Charge 1 | |
| m-Pyrolidinone | 700 |
| Charge 2 | |
| Methyl methacrylate | 1140 |
| Styrene | 460 |
| Maleic Anhydride | 400 |
| Tertiary Dodecyl Mercaptan | 40 |
| Charge 3 | |
| m-Pyrolidinone | 218 |
| LUPERSOL 575 | 102 |
| Charge 3A | |
| m-Pyrolidinone | 43.6 |
| LUPERSOL 575 | 20.4 |

Charge 1 was heated under nitrogen in a suitable reaction vessel with agitation to 120° C. Charge 2 and Charge 3 were added in separate streams to the reaction vessel simultaneously and continued in a substantially continuous manner over a period of 2 hours while maintaining the reaction mixture at 120° C. Charge 3A was then added over a period of 20 minutes and then the reaction mixture was held at 120° C. for 1 hour. The reaction mixture was then cooled to ambient temperature, and the resultant anhydride containing polymer had a total weight solids content of 75.3 percent determined at 110° C. for two hours and a weight average molecular weight of 3852 as determined by GPC using polystyrene standards.

EXAMPLE H

The anhydride containing polymer of Example G was reacted with 4-amino phenol to form a phenolic polymer as follows.

| Ingredients | Weight in Grams |
|---|---|
| Charge 1 | |
| Copolymer from Example G | 2250.0 |
| m-Pyrolidinone | 599.5 |
| 4-aminophenol | 336.8 |
| Charge 2 | |
| Butyl CELLOSOLVE[1] | 637.3 |

[1]Ethylene glycol monobutyl ether available from Union Carbide

Charge 1 was heated under nitrogen in a reaction vessel with agitation to 150° C. and held for sufficient time for the reaction to complete while continuously removing distillate. The reaction was considered complete when the acid value equaled 10.1. Charge 2 was added and the reaction mixture was cooled to ambient temperature. The resultant polymer had a total weight solids content of 55.1 percent determined at 110° C. for 2 hours.

EXAMPLE I

Cationic functionality was imparted on the phenolic polymer of Example H by the use of the Mannich reaction and resultant product was made water soluble by neutralization with an acid as follows.

| Ingredients | Weight in Grams |
|---|---|
| Charge 1 | |
| Phenolic polymer from Example H | 309.4 |
| Butyl CELLOSOLVE | 77.4 |
| Charge 2 | |
| Deionized Water | 43.5 |
| Methyl Ethanol Amine | 25.5 |
| Charge 3 | |
| 37% Formaldehyde | 20.2 |
| Charge 4 | |
| 37% Hydrochloric Acid | 24.6 |
| Deionized Water | 55.4 |
| Charge 5 | |
| Deionized Water | 100.0 |

Charge 1 was heated under nitrogen in a suitable reaction vessel with agitation to 50° C., and then Charge 2 was added. Charge 3 was then continuously added over a period of 1 hour. The resultant reaction mixture was held for 3 hours at 50° C., then heated to 80° C. and held at that temperature for 3 hours. The reaction mixture was then cooled to 50° C. and then Charge 4 was added and mixed well before Charge 5 was added. The reaction mixture was cooled to ambient temperature, and the resultant polymer had a total weight solids content of 33.1 percent determined at 110° C. for 2 hours, and an acid value of 28.6

EXAMPLE J

A phenolic polymer was prepared from the reaction of SMA 1000A styrene maleic anhydride copolymer with 4-aminophenol as follows.

| Ingredients | Weight in Grams |
|---|---|
| Charge 1 | |
| m-Pyrolidinone | 1085.8 |
| SMA-1000A | 489.0 |
| Charge 2 | |
| 4-aminophenol | 234.9 |

Charge 1 was heated under nitrogen in a reaction vessel with agitation to 70° C. Charge 2 was then added and the reaction mixture was heated to 150° C. and held for sufficient time for the reaction to complete while continuously removing distillate. The reaction was considered complete when the acid value equaled 7.8. The resultant polymer had a total weight solids content of 49.4 percent determined at 110° C. for 2 hours.

EXAMPLE K

Cationic functionality was imparted on the phenolic polymer of Example J by the use of the Mannich Reaction and the resultant product was made water soluble by neutralization with nitric acid as follows.

| Ingredients | Weight in Grams |
|---|---|
| *Charge 1* | |
| Phenolic polymer from Example J | 432.9 |
| *Charge 2* | |
| Deionized Water | 18.0 |
| Methyl Ethanol Amine | 37.5 |
| *Charge 3* | |
| Formaldehyde | 40.6 |
| *Charge 4* | |
| 70% Nitric Acid | 45.0 |
| Deionized Water | 100.0 |
| *Charge 5* | |
| Deionized Water | 183.7 |

Charge 1 was heated under nitrogen in a suitable reaction vessel with agitation to 50° C., then Charge 2 was added. Charge 3 was then continuously added over a period of 1 hour. The resultant reaction mixture was held for 3 hours at 50° C., then heated to 80° C. and held at that temperature for 3 hours. The reaction mixture was then cooled to 50° C. To neutralize the resultant phenolic polymer, Charge 4 was added to the reaction mixture, mixed well and then Charge 5 was added. The resultant polymer had a total weight solids content of 35.6 percent determined at 110° C. for 2 hours.

EXAMPLE 2

Cold rolled steel test panels were pretreated and coated as detailed above using final rinses prepared from Examples D, I, and K, then subjected to 50 cycles of the Chipping Scab Cycle Test detailed above. These panels were compared to panels similarly prepared and tested, but using deionized water or CHEMFOS 20 as the final rinse. CHEMFOS 20 is a chrome containing final rinse commercially available from PPG Chemfil, Troy, Mich. The results are as follows.

| Final Rinse | Percent Paint Loss Cold Rolled Steel |
|---|---|
| Example D | 14 |
| Example I | 20 |
| Example K | 20 |
| CHEMFOS 20 | 22 |
| Deionized water | 51 |

EXAMPLE L

Example L shows the preparation of a phenolic polymer by the reaction of EPON 828, a di-epoxide manufactured by Shell Chemical, with 4-amino phenol, on which cationic functionality was imparted by the use of the Mannich Reaction and which was made water soluble by neutralization with acetic acid.

| Ingredients | Weight in Grams |
|---|---|
| *Charge 1* | |
| 4-aminophenol | 164.0 |
| DOWANOL PM[1] | 109.3 |
| *Charge 2* | |
| EPON 828 | 423.0 |
| DOWANOL PM | 282.0 |
| *Charge 3* | |
| Deionized water | 54.0 |
| Methyl Ethanol Amine | 112.5 |
| *Charge 4* | |
| 37% Formaldehyde | 121.5 |
| *Charge 5* | |
| Acetic Acid | 90.0 |
| *Charge 6* | |
| Deionized Water | 505.0 |

[1]Propylene glycol monomethyl ether available from Dow Chemical

Charge 1 was heated under nitrogen in a suitable reaction vessel with agitation to reflux temperature to dissolve and then cooled to 100° C. Charge 2 was then added over a period of one hour, and then the reaction mixture was heated to 120° C. and held for sufficient time for the reaction to complete. The reaction was considered complete when the epoxy equivalent weight equaled 55,555. The reaction mixture was then cooled to 100° C. and then Charge 3 was added. The reaction mixture was cooled to 50° C. and then Charge 4 was continuously added over a period of 1 hour. The resultant mixture was held for 3 hours at 50° C., then heated to 80° C. and held at that temperature for 3 hours. Charge 5 was then added and the reaction mixture was mixed well before Charge 6 was added. The reaction mixture was cooled to ambient temperature, and the resultant polymer had a total weight solids content of 44.3 percent determined at 110° C. for 2 hours, and an acid value of 58.7.

The invention has been set forth in connection with specific embodiments for the sake of disclosing the best mode for carrying out the invention. However, it should be understood that other variations and modifications as are known to those of skill in the art may be resorted to without departing from the scope of the invention as defined by the following claims.

What is claimed is:

1. An aqueous composition comprising of about 0.01 percent to about 10 percent by weight of a water soluble or water dispersible phenolic polymer comprising the reaction product of:

(a) an amino phenol having the following formula:

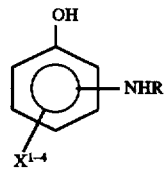

where:

$X^1$ through $X^4$=H, OH, halogen, or an alkyl, aryl, or ether group, or group that is not reactive with anhydrides or epoxides;

R=H or a lower alkyl group having between 1 and 6 carbon atoms;

and, (b) an anhydride-containing polymer having one of the following general formulas:

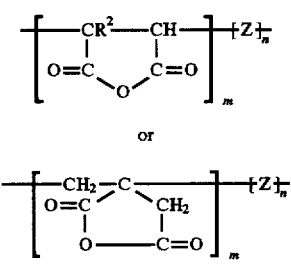

where:

R$^2$=H or CH$_3$

Z=a group derived from an ethylenically unsaturated monomer or monomers capable of polymerizing with an unsaturated anhydride, m and n are integers equal to or greater than 1, the sum of which is sufficient to provide a molecular weight of 600 to 100,000 to the polymer;

or (c) a di-epoxide having the following general formula:

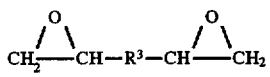

where:

R$^3$=an alkyl, aryl, or cycloalkyl group, optionally containing functional groups such as ether, hydroxyl groups, or other groups that do not interfere with the reaction;

said water soluble or water dispersible polymer including a group imparting cationic functionality to the polymer.

2. The composition of claim 1 wherein the phenolic polymer has the following formula:

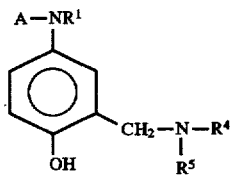

where:

R$_1$=H or a lower alkyl group having between 1 and 6 carbon atoms;

R$^4$ and R$^5$=an ethyl, methyl, hydroxyalkyl group, or where R$^4$ and R$^5$ taken together are a cycloalkyl group, which may contain one or more atoms of N or O; and A=the polymer derived from the anhydride containing polymer or the di-epoxide.

3. The composition of claim 1 wherein the phenolic polymer has the following formula:

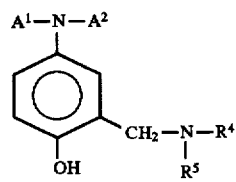

where:

R$^4$ and R$^5$=an ethyl, methyl, hydroxyalkyl group, or where R$^4$ and R$^5$ taken together are a cycloalkyl group, which may contain one or more atoms of N or O; and A$^1$ and A$^2$=polymer segments derived from the anhydride containing polymer or the di-epoxide.

4. The aqueous composition of claim 1 wherein the water soluble or water dispersible phenolic polymer is present in an amount of from about 0.01 percent to about 1 percent by weight.

5. The composition of claim 1 wherein the pH of the composition is about 1 to about 8.

6. The composition of claim 1 wherein the pH of the composition is about 2 to about 6.

7. The composition of claim 1 wherein the water soluble or water dispersible phenolic polymer has a weight average molecular weight of between about 600 and 100,000.

8. The composition of claim 7 wherein the water soluble or water dispersible phenolic polymer has a weight average molecular weight of between about 1000 and 50,000.

9. The composition of claim 8 wherein the water soluble or water dispersible phenolic polymer has a weight average molecular weight of between about 2000 and 10,000.

10. The composition of claim 1 wherein the amino phenol (a) is reacted with an anhydride (b), wherein the ratio of anhydride group to amine group in the reaction is about 1:1 to 3:1.

11. The composition of claim 1 wherein the ratio of anhydride group to amine group in the water soluble or water dispersible phenolic polymer is about 1:1 to 2:1.

12. The composition of claim 1 wherein R$^3$ is an alkyl, aryl, or cycloalkyl group.

13. The composition of claim 1 wherein R$^3$ contains ether or hydroxyl functional groups.

14. The composition of claim 1 wherein the amino phenol (a) is reacted with a di-epoxide (c), wherein the ratio of epoxy groups to amine hydrogen in the reaction is about 1:2 to 3:1.

* * * * *